United States Patent Office.

WILLIAM M. STUART, OF ST. CLAIR, MICHIGAN, ASSIGNOR TO HIMSELF, AUSTIN O. WHITCOMB, WILLIAM S. HOLMES, AND ROBERT H. HOLMES.

Letters Patent No. 102,061, dated April 19, 1870.

IMPROVED ROOFING COMPOUND.

The Schedule referred to in these Letters Patent and making part of the same

*To whom it may concern:*

Be it known that I, WILLIAM M. STUART, of St. Clair, in the county of St. Clair and State of Michigan, have invented a new and useful Improvement in Fire and Water-Proof Composition Roofing, and I do declare that the following is a true and accurate description thereof.

The nature of the invention relates to an improvement in the manufacture of composition roofing, so that the same will be both fire and water-proof, economical to make, durable, and easily applied; and consists in the peculiar and new combination and application of well-known ingredients, as more fully hereinafter described.

Upon felt, paper, or canvas, or upon the roof-boards themselves, when sufficiently tight, I spread heated coal-tar.

Previous, however, to doing this, I thoroughly mix eight quarts of water-lime, eight quarts of calcined plaster, two quarts of common salt, and two pounds of pulverized alum with one barrel of dry sand.

After spreading the coal-tar, as above recited, and before the same is cooled, the mixture just described should be evenly spread upon the coal-tar, which, as it cools, hardens, and cements the whole of the ingredients together and to the roof, producing a roof which will be weather and fire-proof, very durable, and not liable to wash.

The alum, instead of being pulverized and mixed with the other ingredients, as above recited, may be melted in the coal-tar, if deemed preferable.

What I claim as my invention, and desire to secure by Letters Patent, is—

The roofing composition hereinbefore described and set forth.

Witnesses:       WILLIAM M. STUART.
   H. S. SPRAGUE,
   JAS. O'BRIEN.